United States Patent [19]

Bastle

[11] 4,008,876
[45] Feb. 22, 1977

[54] SOLENOID VALVE

[75] Inventor: Clifford F. Bastle, Milwaukee, Wis.

[73] Assignee: The Singer Company, New York, N.Y.

[22] Filed: June 9, 1975

[21] Appl. No.: 584,759

[52] U.S. Cl. .............................. 251/129; 251/141
[51] Int. Cl.² ...................................... F16K 31/06
[58] Field of Search ................. 251/76, 77, 129; 251/141

[56] References Cited

UNITED STATES PATENTS

| 2,596,409 | 5/1952 | Johnson et al. | 251/129 X |
| 2,650,617 | 9/1953 | Wasser | 251/129 |
| 2,695,154 | 11/1954 | Dillman | 251/77 |
| 2,698,159 | 12/1954 | Crum | 251/129 |
| 3,578,284 | 5/1971 | Martini | 251/129 X |

Primary Examiner—Arnold Rosenthal
Attorney, Agent, or Firm—Michael, Best & Friedrich

[57] ABSTRACT

When the valve is closed, the pressure differential across the valve port area acts to hold the valve on its seat and must be overcome to open the valve. At this time the gap between the armature and the core of the solenoid is at its greatest and, therefore, the magnetic force available upon energization of the coil is at its lowest. Due to the lost motion connection between the armature and the valve, the magnetic force available is required to only lift the armature and compress the armature return spring and the valve spring and, therefore, need not overcome the pressure differential acting across the area of the port. When the armature has almost reached the core, the armature impacts on the head of the valve and the kinetic energy of the armature plus the now increased magnetic force (by reason of decreased gap) are available to unseat the valve. After the valve is unseated and the armature seats on the core, the valve spring continues the valve opening motion to fully open the valve. With this arrangement a given coil can operate a much larger valve than in the conventional solenoid valve.

3 Claims, 4 Drawing Figures

SOLENOID VALVE

BACKGROUND OF THE INVENTION

With the conventional design of solenoids the coil size required to open the valve increases considerably as the port size increases, this being due to the fact the solenoid valve starts opening at its lowest magnetic force condition while the starting point represents the need for the greatest force.

SUMMARY OF THE INVENTION

With the present design the actual opening of the valve is delayed until the solenoid armature has moved into close proximity with the core to utilize the greatly increased working force available at small working gaps. Therefore, the port size controlled by the valve can be increased appreciably without increasing the size of the coil.

DESCRIPTION OF THE PREFERRED EMBODIMENT

Figure 1:
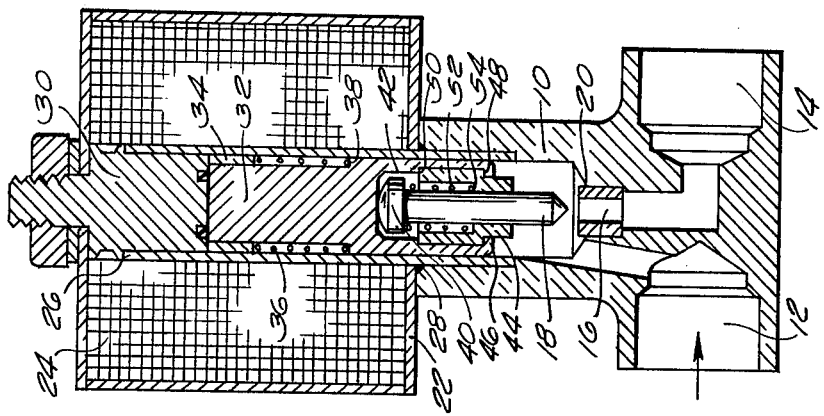
FIG. 1 is a vertical section illustrating the valve in the closed position with the coil de-energized.

The valve housing 10 has an inlet 12 and outlet 14 separated by a valve port 16 with the valve 18 seating on seat 20 when the valve is closed as in FIG. 1. The difference in pressure between the inlet and the outlet acts across the area of the port 16 and, when the valve is closed, this pressure differential acts to hold the valve on the seat. The coil frame 22 is mounted on the housing 10 and encloses a coil 24. Sleeve 26 is mounted inside the coil and extends into the housing and is sealed with respect to the housing at 28. The upper end of the sleeve is connected to the core 30. Inlet pressure is sealed by the sleeve and the core. The upper end of the armature 32 is guided in a non-magnetic sleeve 34 which also serves as a seat for the armature return spring 36, the lower end of which acts against shoulder 38 on the armature 32. The lower enlarged portion of the armature is guided in sleeve 26.

The enlarged head 40 of valve 18 is received in cavity 42 in the bottom of the armature. The valve stem is guided by the lower reduced diameter portion of the guide 44 mounted in the lower end of armature 32. The lower end of the armature is rolled in at 46 against the shoulder 48 on the guide 44 to retain the guide against the inside shoulder 50 in the armature. A valve spring 52 is compressed between the seat 54 on the inside of the guide 44 and the head 40 of valve 18, thus biasing the valve 18 upwardly to the position shown in FIG. 1.

When the valve is closed, as in FIG. 1, the pressure acts across the area of the port to hold the valve on its seat with a force which is a function of the pressure differential and the area of the valve. At this point the upper end of the armature 32 is at its maximum working gap from the core 30 and thus the available magnetic force upon energization of coil 24 is at its minimum.

When the coil is energized, the magnetic force need be sufficient to only lift the armature 32 and compress return spring 36 and valve spring 52. Thus the valve 18 remains closed while the armature starts moving upwardly and the air gap between the armature and the core decreases and the magnetic force increases markedly.

Figure 2:
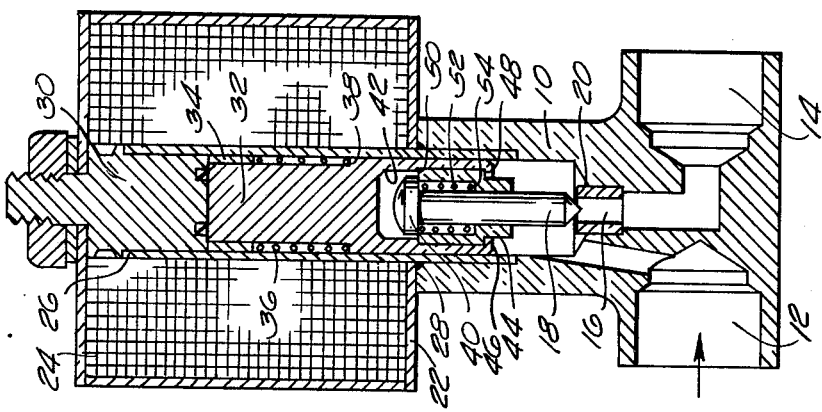
FIG. 2 is similar to FIG. 1 and shows the valve after completion of the initial stroke of the armature to the position in which it impacts on the still closed valve.
Figure 3:
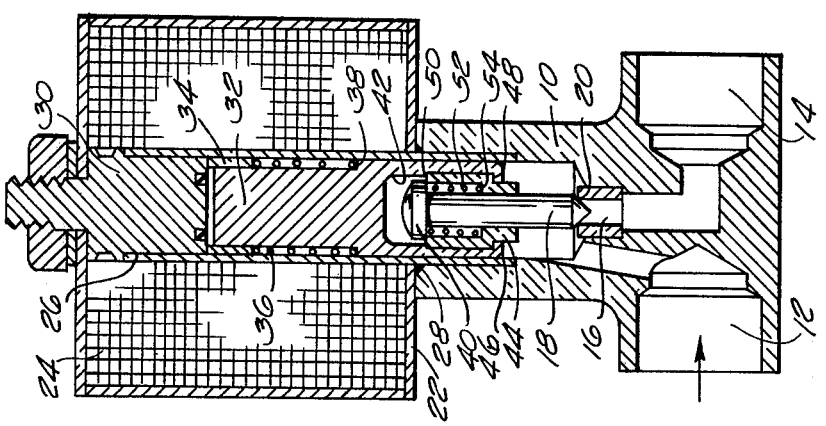
FIG. 3 illustrates the valve when the armature has moved upwardly to its full limit and the valve has been partially opened.
Figure 4:
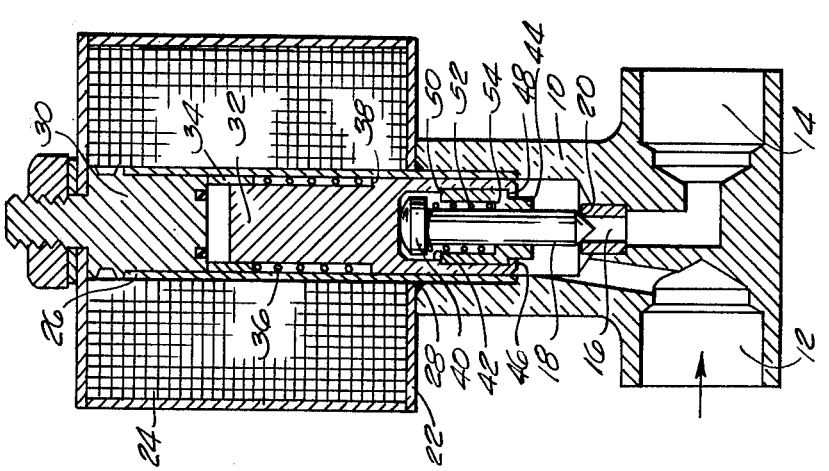
FIG. 4 illustrates the full open position of the valve with the movement of the valve from the position in FIG. 3 being caused by the valve spring.

When the lost motion between the head 40 of valve 18 has been taken up, the valve head 40 will be impacted by the upper end of guide 44 as illustrated in FIG. 2. At this moment there is a very small air gap between the armature and the core and thus there is a greatly increased magnetic force available. This high magnetic force coupled with the kinetic energy of the moving armature now operate to unseat the valve while the armature continues to its fully seated position as illustrated in FIG. 3. At this point the valve 18 has moved off its seat and the pressure acting across the valve is vastly decreased. Now the valve spring 52 can operate to lift the valve the remaining distance to, in effect, restore the lost motion and fully open the valve, all as illustrated in FIG. 4.

When the coil is de-energized, the return spring moves the armature to the position shown in FIG. 1, at which time the valve is closed.

This construction permits a given coil to open a much greater port area than the prior solenoid valve designs. As a result the cost of a valve having a given capacity is greatly decreased by reason of the reduced requirement for copper in the coil. The size of the complete valve is smaller. Copper and other materials are saved.

I claim:
1. A solenoid valve comprising,
   a housing having an inlet and outlet separated by a valve port,
   a valve on the inlet side of the port movable relative to the port to control flow from the inlet to the outlet,
   a coil mounted on the housing,
   a core inside the coil and magnetized by the coil when the coil is energized,
   an armature slidable inside the coil and having its working face spaced from the core when the valve is closed,
   said valve having a lost motion connection to the armature with a positive limit stop at each end of the motion,
   a return spring acting on the armature in a direction moving the armature to the valve closing position,
   a spring acting on the valve and moving the valve to a position against one limit stop providing the maximum lost motion between the armature and the valve,
   energization of the coil acting to initially move the armature towards the core against the weight of the armature and the compression force of both springs,
   the lost motion between the armature and the valve being taken up upon impact of the valve against the other limit stop prior to the armature seating against the core whereby the increased available magnetic force and the kinetic energy of the moving armature act to unseat the valve before the armature seats against the core, said valve spring acting to move the valve further from the port after the armature has seated against the core.

2. A solenoid valve according to claim 1 in which the end of the armature facing the valve has a cavity therein, said valve including a stem projecting into the cavity and having an enlarged head in the cavity, said armature being provided with a guide for said stem, said valve spring acting between the guide and the valve head and urging the head into contact with the end of the cavity in the armature to determine said one limit stop, said other limit stop being determined by engagement of the stem head with said guide.

3. A solenoid valve comprising, a housing having an inlet and an outlet separated by a port, a valve in the housing and controlling flow through the port, an electric coil mounted on the housing, an armature in the coil and movable into the coil when the coil is energized, said valve having a lost motion connection to the armature with a positive limit stop at each end of the motion, a spring urging the valve to a first position relative to the armature against one limit stop, said lost motion being taken up when the coil is energized whereby the armature moves in the valve opening direction upon initial energization of the coil and against the bias of said spring until the valve impacts on the other limit stop at which time the armature is close to its limit of motion in the valve opening direction, said spring serving to store energy during movement of the armature and serving to continue the valve opening movement after the armature reaches the limit of its movement, and a spring acting on the armature in the valve closing direction and acting on said valve through said one limit stop to give a predetermined closing force.

* * * * *